(12) United States Patent
Genssle et al.

(10) Patent No.: US 8,874,309 B2
(45) Date of Patent: Oct. 28, 2014

(54) METHOD FOR ACQUIRING INFORMATION (75) Inventors: Andreas Genssle, Musberg (DE);
Michael Kolitsch, Weissach (DE);
Tobias Pfister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 885 days.

(21) Appl. No.: 12/674,955

(22) PCT Filed: Sep. 10, 2008

(86) PCT No.: PCT/EP2008/061995
§ 371 (c)(1),
(2), (4) Date: Feb. 24, 2010

(87) PCT Pub. No.: WO2009/049969
PCT Pub. Date: Apr. 23, 2009

(65) Prior Publication Data
US 2011/0130917 A1 Jun. 2, 2011

(30) Foreign Application Priority Data
Oct. 10, 2007 (DE) .......................... 10 2007 048 610

(51) Int. Cl.
*G06F 7/00* (2006.01)
*G06Q 50/30* (2012.01)
*G07C 5/08* (2006.01)

(52) U.S. Cl.
CPC .............. *G07C 5/085* (2013.01); *G06Q 50/30* (2013.01)
USPC ........ 701/33; 701/1; 701/19; 701/29; 701/30; 701/36; 701/37; 701/49; 701/54; 701/89; 701/99; 701/207; 60/286; 60/287; 60/297; 345/475; 600/437; 477/3; 123/3; 358/1.11; 714/23; 307/10.1; 709/203; 715/744; 440/89 R (58) Field of Classification Search
USPC ............. 701/1, 19, 29, 30, 36, 37, 49, 54, 89, 701/99, 102, 207; 60/286, 288, 297; 345/475; 600/437; 477/3; 123/3; 358/1.11; 714/23; 307/10.1; 709/203; 715/744; 440/89 R
See application file for complete search history.

(56) References Cited

U.S. PATENT DOCUMENTS 8,317,557 B2 *  11/2012  Dudarenke et al. ......... 440/89 R
2001/0050685 A1 *  12/2001  Simons ......................... 345/475
(Continued)

FOREIGN PATENT DOCUMENTS

DE  10319331  10/2004
GB  2361794  10/2001
(Continued)

OTHER PUBLICATIONS

International Search Report, PCT International Patent Application No. PCT/EP2008/061995 dated Mar. 27, 2009.

*Primary Examiner* — James Trammell
*Assistant Examiner* — Sanjeev Malhotra
(74) *Attorney, Agent, or Firm* — Kenyon & Kenyon LLP (57) ABSTRACT

A method for acquiring information from a driving operation of a vehicle, in which first information is acquired with respect to at least one operating state of the vehicle and additional second information is ascertained with respect to this at least one operating state using statistical methods, the first and second information concerning this at least one operating state being stored. A method for the assigning and diagnosis of at least one operating state of a vehicle, a control unit, a computer program and a computer-program product are also provided.

19 Claims, 4 Drawing Sheets

(56) References Cited

U.S. PATENT DOCUMENTS

| | | | |
|---|---|---|---|
| 2001/0054285 A1* | 12/2001 | Ohmori et al. | 60/288 |
| 2002/0007243 A1* | 1/2002 | Yamaguchi | 701/89 |
| 2002/0035326 A1* | 3/2002 | Kamiyama | 600/437 |
| 2002/0035423 A1* | 3/2002 | Shank et al. | 701/37 |
| 2002/0049115 A1* | 4/2002 | Suzuki | 477/3 |
| 2003/0176959 A1* | 9/2003 | Breed | 701/36 |
| 2003/0191581 A1* | 10/2003 | Ukai et al. | 701/207 |
| 2004/0078135 A1 | 4/2004 | Kura et al. | |
| 2004/0221572 A1* | 11/2004 | Treiber | 60/297 |
| 2005/0021212 A1* | 1/2005 | Gayme et al. | 701/99 |
| 2005/0274331 A1* | 12/2005 | Eberspach | 123/3 |
| 2006/0047374 A1* | 3/2006 | Hashimoto et al. | 701/1 |
| 2006/0080953 A1* | 4/2006 | Maus et al. | 60/286 |
| 2006/0142907 A1 | 6/2006 | Cancilla et al. | |
| 2006/0200283 A1* | 9/2006 | Furuno et al. | 701/29 |
| 2007/0139680 A1* | 6/2007 | Eschbach et al. | 358/1.11 |
| 2007/0158128 A1 | 7/2007 | Gratz et al. | |
| 2007/0180318 A1* | 8/2007 | Morozumi | 714/23 |
| 2007/0219681 A1* | 9/2007 | Kumar et al. | 701/19 |
| 2007/0225881 A1 | 9/2007 | McAndrew et al. | |
| 2007/0276561 A1* | 11/2007 | Tripathi et al. | 701/30 |
| 2008/0077298 A1* | 3/2008 | Hattori et al. | 701/49 |
| 2008/0238192 A1* | 10/2008 | Hashimoto et al. | 307/10.1 |
| 2008/0270519 A1* | 10/2008 | Ekdahl et al. | 709/203 |
| 2009/0118920 A1* | 5/2009 | Heap et al. | 701/54 |
| 2009/0222189 A1* | 9/2009 | Books et al. | 701/102 |
| 2009/0327910 A1* | 12/2009 | Black et al. | 715/744 |

FOREIGN PATENT DOCUMENTS

| | | |
|---|---|---|
| GB | 2414557 | 11/2005 |
| JP | 2003/114943 | 4/2003 |
| JP | 2005/337040 | 12/2005 |
| KR | 1020050030316 | 3/2005 |
| WO | WO 2005/057519 | 6/2005 |

* cited by examiner

METHOD FOR ACQUIRING INFORMATION

FIELD OF THE INVENTION

The present invention relates to a method for acquiring information, a method for assigning and diagnosing an operating state, a control unit, a computer program and a computer-program product.

BACKGROUND INFORMATION

Various methods are described for the acquisition of information from the operation of a vehicle during operation.

Japanese Patent Application JP 2005/337040 A describes a procedure in which the exhaust-gas mass flow and the effective opening surface of a particulate filter of an engine are calculated with the aid of an electronic processing unit. In that case, statistical evaluation algorithms are used to calculate the change in the exhaust-gas back pressure, and a suitable time is ascertained for the thermal regeneration of the particulate filter.

Korean Patent Application KR 10 20050030316 A describes an electronic diagnostic unit for a production line for series production, the diagnostic unit making it possible to efficiently check the manufactured production variants and to support a quality process by automated procedures. This yields savings in the end-of-line inspection.

A method for collecting and managing vehicle information from the field is described in International Patent Application No. WO 2005/057519. Using the method described in this document, data is gathered from the vehicle operation and subjected to a statistical evaluation. A fault analysis is then carried out based on the analyzed vehicle information. In so doing, a management base station is used for transmitting and processing the data.

Japanese Patent Application JP 2003/114943 A describes a mobile vehicle-fault diagnostic device, a vehicle-data storage and a vehicle diagnostic system. In that case, an information-gathering and preparation tool is made available for the exact vehicle diagnostics. Diagnostics and repairs may then be carried out in the service garage based on the collected data and by accessing a data memory.

U.S. Patent Application No. US 2004/0078135 A1 describes a vehicle inspection system in which information from the vehicle operation is recorded in the non-volatile memory within the engine control unit. This information relates to the frequency of the fault diagnosis and the operational frequency of the OBD or on-board diagnostic system. This information is then available and accessible via a diagnostic scan tool for OBD purposes.

Great Britain Patent No. GB 2414557 A describes a vehicle-data recorder. Also provided here is the use of an additional module which records the relevant vehicle information provided during vehicle operation via an OBD interface, and prepares this information using a special evaluation software so that, for example, after an accident, the operating behavior preceding the accident is known. In addition, the vehicle information may be stored upon request of the driver.

German Patent Application No. DE 103 19 331 B3 describes a method for evaluating the uneven running of a combustion engine. In so doing, a signal which represents the uneven running of a combustion engine is evaluated, and a specific program-map area of the combustion engine is determined. A counter of the program-map area is increased on the basis of a signal.

The present invention relates to a method for acquiring information from the operation of a vehicle which usually has an internal combustion engine, in which first information is acquired with respect to at least one operating state of the vehicle, and additional second information is ascertained with respect to this at least one operating state using statistical methods, the first and second information concerning this at least one operating state being stored.

Usually, the first information, and therefore corresponding values for the first information, is derived directly from raw data provided by vehicle sensors, and made available. Thus, operating parameters, able to be determined continuously based on the first information, are ascertained with respect to the at least one operating state. The additional second information may include a first analysis and evaluation of the raw data, and thus also of the first information. Accordingly, by acquiring the second information, the at least one operating state may already be assessed in summary during the vehicle operation.

In one example embodiment of the method, statistical characteristic values which are formed, for example, by averaging the raw data and/or the first information, are stored as second information. Therefore, a statistical characteristics formation and evaluation of driving-condition information are possible by providing the second information. A probability of certain malfunctions as possible operating states of the vehicle or of defective components of the vehicle may be derived from this second information.

Accordingly, among other things, information concerning an operating state classified as fault may be stored using the method. However, information concerning operating states not classified as faulty may also be stored. In order, to this end, not to constantly acquire raw data concerning a plurality of operating states, this raw data may be stored in space-saving manner by providing summarizing second information. Thus, for example, functions, e.g., auxiliary algorithms or characteristic values may be formed from an accumulation of various raw data collected over a longer period of time during the vehicle operation, and these functions or characteristic values may be stored as the second information.

In addition, it is possible to scale the information, while providing a sufficiently precise resolution. In this manner, storage, particularly of the second information, which is efficient and saves on storage space is able to be realized on a storage module of a control unit of the vehicle. To reduce the volume of data accumulating, instead of exact values of the raw data, values showing a tendency may be indicated, so that instead of storing the exact value, it is only stored whether, for example, the value is greater than, less than or equal to a predefined value. Moreover, the resolution may also be a function of a faultiness and/or a type of fault of the at least one operating state, so that a switchover to at least one other operating state may be carried out. Thus, with respect to serious faults, the data may be stored under a higher resolution, and in the case of less relevant faults, the data may be stored under a low resolution. In addition, the data with respect to the information may be combined by suitable scaling and stored. Therefore, a suitable scaling may be determined for a multitude of raw data for specific operating parameters.

Suitable rules may be established for assessing faultiness or a fault, so that in one special embodiment of the present invention, it is possible to assess the faultiness of a component or of faults by statistical evaluation. All in all, the storage values may be scaled to a sufficiently exact resolution in a volume of information within a memory of the control unit.

In a further exemplary embodiment of the present invention, the information may be acquired, for example, with respect to an operating state of an exhaust system for an internal combustion engine of the vehicle, such an internal combustion engine being operated as a rule with gasoline or diesel.

In addition, the present invention relates to a method for assigning and diagnosing at least one operating state of a vehicle, in which information that is acquired according to the method described above is taken into consideration.

In a further development of the method, the information is transmitted to a device for performing the diagnostics. This method may also be carried out accompanying operation, and consequently during the operation of the vehicle. In the case of remote diagnostics to be carried out accompanying operation, for example, the information may be transmitted to a data base of the central device, e.g., a manufacturer or an original equipment manufacturer (OEM) for providing a centralized diagnosis or remote diagnostics. To that end, the information transmitted in this case may be stored in a data base and processed using a computing device. Such a remote transmission may usually be carried out when there are sufficient data records with the information. The transmission or remote transfer may also be implemented to a service device or service garage.

According to an embodiment of the present invention, a control unit is provided for acquiring information from a driving operation of a vehicle, this control unit being designed to acquire first information with respect to at least one operating state of the vehicle and to ascertain additional second information concerning this at least one operating state using statistical methods, and to store the first and second information with respect to this at least one operating state.

This control unit described is designed to carry out the steps of the method described above. To store the information, the control unit may have at least one memory, e.g., in the form of an EEPROM.

The present invention further relates to a computer program having program-code to carry out all steps of an envisaged method when the computer program is executed on a computer or a corresponding processing unit, particularly in the control unit described.

A computer-program product additionally provided according to the present invention, having program-code which are stored on a machine-readable data carrier, is designed to carry out all steps of the method described above when the computer program is executed on a computer or a corresponding processing unit, particularly in the control unit envisaged.

The control unit described may be complemented by this computer program.

For example, using the present invention, it is also possible to implement an unequivocal, operation-accompanying assignment and diagnosis of fault symptoms originating from a vehicle device in the form of an exhaust system, for instance, in the course of which, raw data, which is provided by at least one sensor during the operation of the vehicle, is stored in scaled fashion as a function of a faultiness of an operating condition in order to make available a suitable resolution of at least the second information; in the case of a normal operation, the storage takes place under a low resolution, and in the case of an operating situation characterized by faults or a corresponding operating state, storage takes place under a high resolution.

Therefore, meaningful information concerning faults may also be obtained using the method. A clear-cut assignment and diagnosis of fault symptoms may thereby be realized. The statistical characteristics formation may be generated in view of rules for a probability, particularly a probability of faults. Space-saving storage is also possible, regardless of whether the at least one operating state is faulty or not. In a further variant of the method, not only are faults stored during driving, but also—in order to provide the second information—statistical characteristic values are stored as well, which likewise may be stored in space-saving fashion. Thus, it is possible, inter alia, to now scale information and therefore data—which as a rule contain 16 bits—in such a way that only 4 bits are necessary for this purpose. Therefore, a greater resolution may be attained, a mapping or a corresponding imaging of the information being configurable.

Using the method, it is therefore possible, inter alia, to implement a statistical formation of characteristics and evaluation of driving-condition information for a service garage diagnostic.

In this context, a method is further provided for gaining meaningful information for the reliable and unequivocal diagnosis and assignment of fault symptoms from the vehicle operation, which are detected for the exhaust system.

The functional supplementation of the control-unit software provided in the refinement here allows a way to selectively obtain information from the vehicle operation which is scalable in the volume of information, and therefore preserving of storage space and processor resources. For instance, this method may be used in the case of internal combustion engines having an exhaust system made up of oxidizing catalytic converter, diesel particulate filter and the associated sensor suite, including temperature sensor, pressure sensor or differential-pressure sensor. Other exhaust-system configurations having general catalytic devices and/or hydraulic determination for introducing additional active or passive auxiliary agents to the exhaust-gas treatment (EGT) to reduce the emissions-relevant exhaust-gas components are likewise feasible. The method indicated may therefore be employed regardless of the configuration used.

Typically, the collected and statistically evaluated second information may be used in light of the active service garage diagnostics to ascertain defective vehicle components. With the aid of this first and second information, it is possible to detect the reason for an abnormal system behavior in the exhaust branch and to initiate further tests. This may be used for the protection of sensors or other components of the injection system.

The first, as well as the second information generated in the course of the method may likewise be used for the further development of the vehicle operating strategy and the exhaust-gas operating strategy.

In a further development of the present invention, the storage of the raw data collected during the driving cycle from which the first information is usually derived, and the generated characteristics for providing the second information, in the EEPROM memory and therefore in an electronically erasable, programmable read memory of the control unit furnishes a data base for the diagnostics, e.g., for controlled troubleshooting in the service garage.

Among other things, rules may be determined for the stored information and therefore data, by which the probability of specific malfunctions or faulty components may be deduced. Typically, this method is suitable for a system having a particulate filter and offers possible application areas there because of the difficulty in performing a diagnostic on an internal combustion engine having an exhaust-gas treatment system.

The storage in the EEPROM memory of the raw data gathered during the driving cycle and the generated characteristics from which the second information may be deduced furnishes a data base for the further development of control-unit functions or engine components. The statically evaluated field data form the basis for detecting problems and what are referred to as worst cases.

In addition, the method described permits the space-saving storage of values in the EEPROM of the control unit. By scaling the storage values to a sufficiently exact resolution, the resources required within the control unit may be sharply reduced.

In one specific embodiment, the method may be used within the framework of regeneration statistics. In that context, information may be supplied for the diagnosis of faults in the service garage, in the course of which, defective components may be identified. For example, such defective components may cause increased soot emissions, so that a diesel particulate filter (DPF) is no longer able to regenerate. In addition, information about driving behavior may be acquired. Therefore, justification may be offered in response to ultimate-customer complaints, for example, in the case of excess fuel consumption, and the plausibility of fault profiles may be determined. Optionally, storage of statistical information as feedback for development is possible. Typically, useful information is stored in the EEPROM, this being done under the boundary condition that expenditure of resources in the control unit is optimized.

Within the scope of such regeneration statistics for the diesel particulate filter, it is possible to make information available for the fault diagnosis in the service garage via what is called a differential mobility analyzer (DMA), a measuring device for determining the mobility distribution of gas-borne particulates, and in addition, indirectly, the size distribution of these particulates.

Listed in the following is an exemplary overview of the information to be stored here as measured values or of stored values at the start of the regeneration.

Triggering criterion for the instantaneous regeneration
Soot mass (measurement simulation) at the beginning of the regeneration
km-reading at the start of the regeneration
Simulated soot mass at the beginning of the regeneration
Measured soot mass at the beginning of the regeneration
Average driving-cycle duration since the last regeneration (*)
Average speed since the last regeneration (*)
Normalized ratio of dynamic/total soot or average acceleration since the last regeneration (*)
Counter not sufficient rgn- or load-phase (see below)

In the following is a list of the information to be stored as measured values or stored values at the end of the regeneration:

Criterion for end of the regeneration
Maximal temperature in front of the DPF during the regeneration (*)
Maximal temperature in front of the oxicat/turb during the regeneration (*)
Regeneration duration (*)
Simulated soot mass at the end of the regeneration
Measured soot mass at the end of the regeneration
Average soot burn-off rate (*)
Average controller output of the inner temperature controller (*)
Average controller output of the outer temperature controller (*)
Average EngPOp/speed during the regeneration (*)

Typically, a calculation is necessary for measured values marked with (*).

In a further development, information which takes the form of universal values and which, in particular, was gathered since a last vehicle maintenance service may be acquired. In that case, in addition to storing n individual regenerations, a general record of measured values may be stored having the most questionable values and therefore information since the last maintenance service. Here, the most important EDC (electronic diesel control) variables for an injection system of a diesel engine are, for example, the maximum temperature of the oxidizing catalytic converter and diesel particulate filter, a maximum difference between a soot-quantity measurement as first information and a soot-quantity simulation as second information at the start or at the end of the regeneration and/or the extreme values of the system deviation. If, in this context, n=1 is provided with a data record and therefore set, only this general data record is stored, and thus there is a changeover to an economy mode.

A storage coordination provides, inter alia, for filtering the regeneration or loading phase, in doing which, very short loading phases and regeneration phases, e.g., in the case of aborted regenerations, are usually not stored. One possible marginal condition of the filtering provides that a data pair made up of regeneration start and regeneration end may always be stored as information.

Further example advantages and refinements of the present invention are described below and shown in the figures.

It is understood that the aforementioned features and the features yet to be explained below may be used not only in the combination indicated in each instance, but also in other combinations or by themselves, without departing from the scope of the present invention.

DETAILED DESCRIPTION OF EXAMPLE EMBODIMENTS

The present invention is represented schematically in the figures in light of exemplary embodiments, and is described in detail below with reference to the figures.

Figure 1:
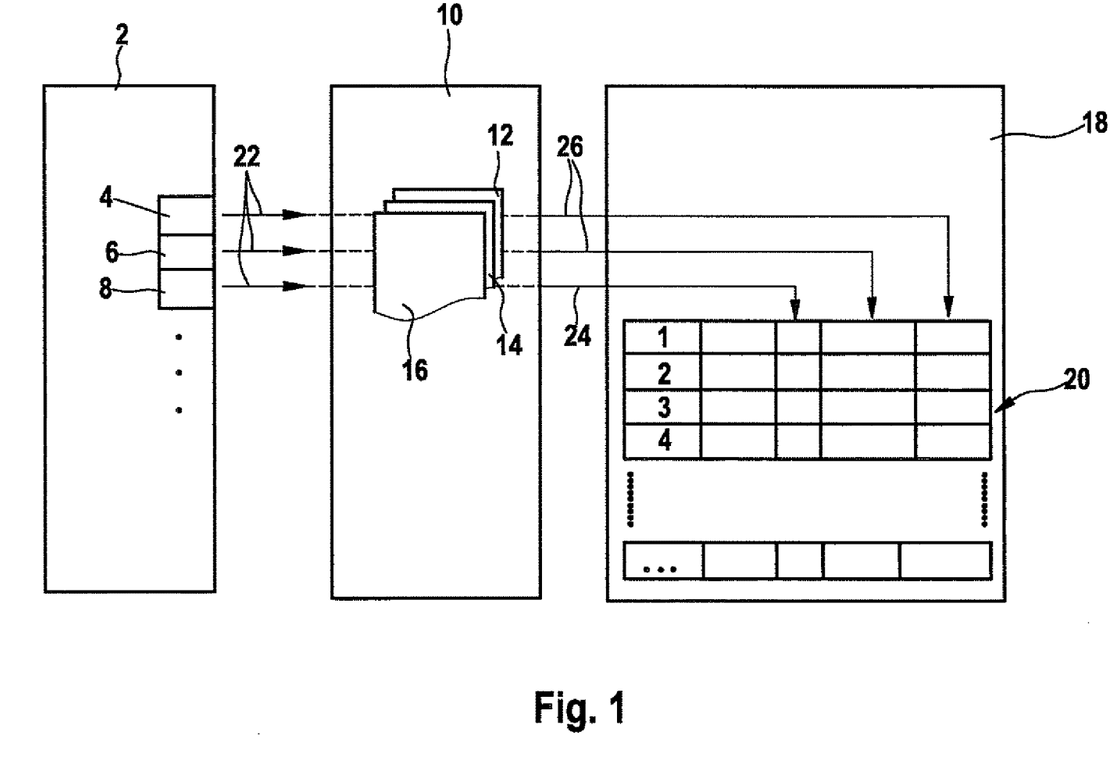
FIG. 1 shows a first schematic representation with respect to a first specific embodiment of the method according to the present invention.

Each of FIGS. 1 through 4 shows a schematic representation with respect to a first specific embodiment of the method according to the present invention, with which, in the present case, regeneration statistics are made available for a diesel particulate filter (DPF). In this context, FIG. 1 shows, in schematic representation, a function block 2 of the diesel particulate filter, having a first function 4, a second function 6 and a third function 8. Still further functions of the diesel particulate filter may be provided, as well.

FIG. 1 further shows a regeneration statistics block 10 for a new function, which has a first data file 12 for a scaling, a second data file 14 for a coordination and a third data file 16 for calculations.

FIG. 1 also shows a memory 18, taking the form here of an EEPROM. This memory 18 includes a table having a number of n lines, only the first four lines and the last nth line of this table 20 being shown. In the example embodiment described here, in each case the n entries in table 20 include two times 32 bits, one entry being input into table 20 per loading and regeneration cycle.

In realizing the regeneration statistics, in each case raw data 22 having a length of 16 bits is transmitted from the three indicated functions 4, 6, 8 to regeneration statistics block 10. From this raw data 22 provided as first information, by the provision of data files 12, 14, 16, information which is modified by regeneration statistics 10 and thus is second information 24 is made available, this second information 24, which is subsequently transmitted to memory 18 and provided for the third column of table 20, having a size of one bit. Second information 26, which is provided for the fourth and fifth columns of table 20, in each case encompasses a length of three bits. Second information 24, 26 described is calculated using statistical methods and therefore formed from raw data 22, taking data files 12, 14, 16 into account.

Figure 2:
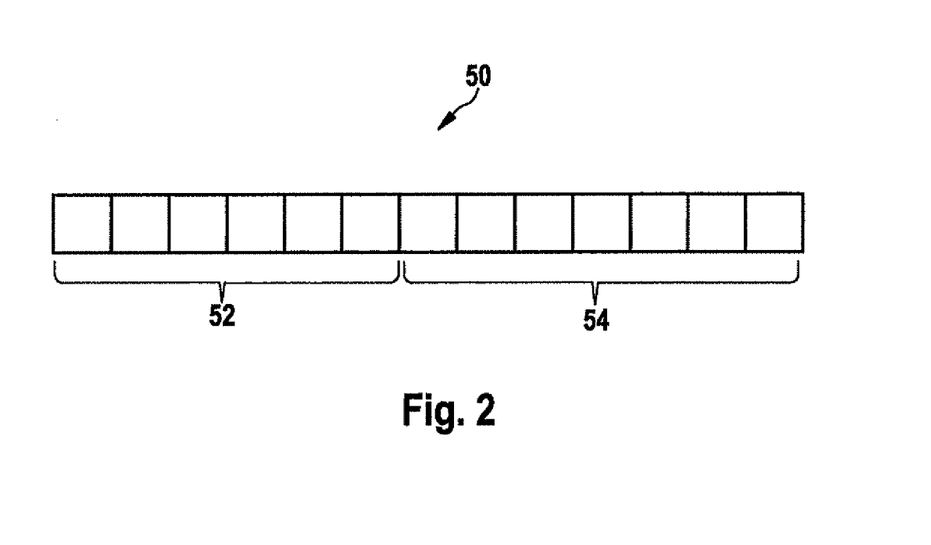
FIG. 2 shows a second schematic representation with respect to the first specific embodiment of the method according to the present invention.

With the aid of the schematic representation in FIG. 2 with respect to the present first specific embodiment of the method, the intention is to show a partitioning of one entry per regeneration cycle within the framework of the regeneration statistics for the diesel particulate filter. Within that context, shown here in schematic representation is a memory area 50, which in the present case includes six first memory spaces 52 and seven second memory spaces 54. First memory spaces 52 are provided for values of information at the end of a loading of the diesel particulate filter and thus at the beginning of the regeneration. Second memory spaces 54 are provided for values at the end of the regeneration.

Figure 3:
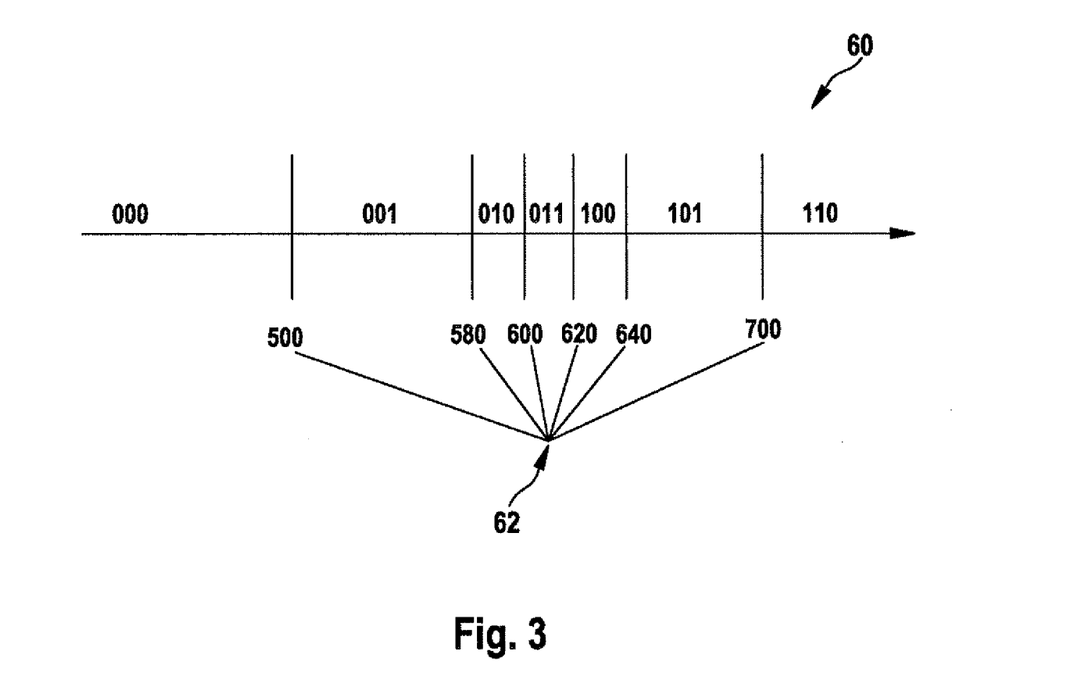
FIG. 3 shows a third schematic representation with respect to the first specific embodiment of the method according to the present invention.

To make the regeneration statistics available for the diesel particulate filter, in the course of the example method, it is provided in the present case to perform a non-linear scaling 60, represented with reference to FIG. 3, for values of the memory provided from the information. Within this non-linear scaling 60, values for a bit coding, here "000" "001", "010", "011", "100", "101" and "110", are entered in an upper line. Represented schematically below non-linear scaling 60 are values 62, for which individual temperatures from 500 to 700° C. of the diesel particulate filter are plotted in the example. In this context, based in each instance on an assignment of one temperature to one bit coding, non-linear scaling 60 shows which resolution is implemented for the temperature by non-linear scaling 600. Stored within this non-linear scaling 60 are values, and therefore information about values 62, for example, about a maximum temperature, shown here, of the diesel particulate filter during a regeneration, this temperature being scaled here to 3 bits. In the event an error should occur during a phase of the regeneration statistics, bit-coded substitute values, e.g., "111", are stored for the values in question.

Figure 4:
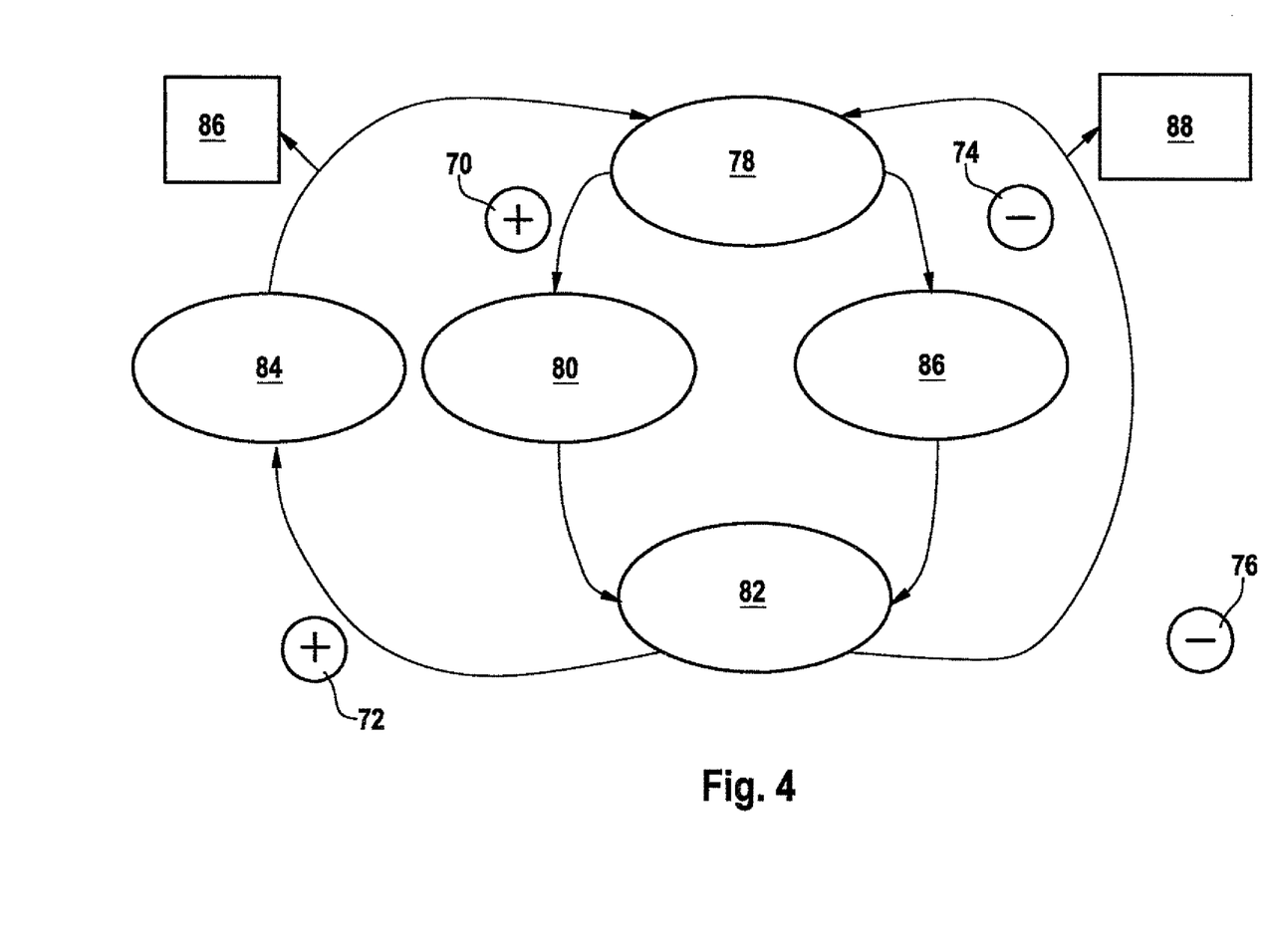
FIG. 4 shows a fourth schematic representation with respect to the first specific embodiment of the method according to the present invention.

FIG. 4 shows a schematic representation of a flow chart for the coordination of the regeneration statistics, provided within the scope of the method, for the diesel particulate filter. This flow chart clarifies when the information or corresponding values are stored. Shown in a left section are positive conditions 70, 72 to be affirmed with entered plus sign, and to the right are negative conditions 74, 76 to be negated with minus sign.

This flow chart also shows that a loading phase 78 is active. Starting from there, first positive condition 70 must be checked as to whether a regeneration is started, and a sufficiently high soot load is present. Therefore, a storage 80 of start values is implemented within the regeneration statistics. Taking into account a second positive condition 72, according to which the regeneration is advanced sufficiently, and furthermore, a percentage soot-mass decrease in relation to the starting mass below the threshold is specified, a storage 84 of end values is implemented within the regeneration statistics. Subsequently, a new entry 86 is provided by increasing a counter n=n+1. Within a second branch of the flow chart of FIG. 4, it is assumed that loading phase 78 is active; a first negative condition 74 is taken into account, according to which a regeneration is too short, whereby a percentage soot-mass increase above the set threshold results. Next, a storage 86 of start values is implemented within the regeneration statistics, the counter being increased by 1. It is thereupon provided that regeneration 82 is active. Starting from there, second negative condition 76, according to which the regeneration phase is too short, is taken into account. In this case, this means that a percentage soot-mass decrease in relation to the starting mass below the set threshold takes place. This means that entry 88 is discarded, and n=n is set.

Figure 5:
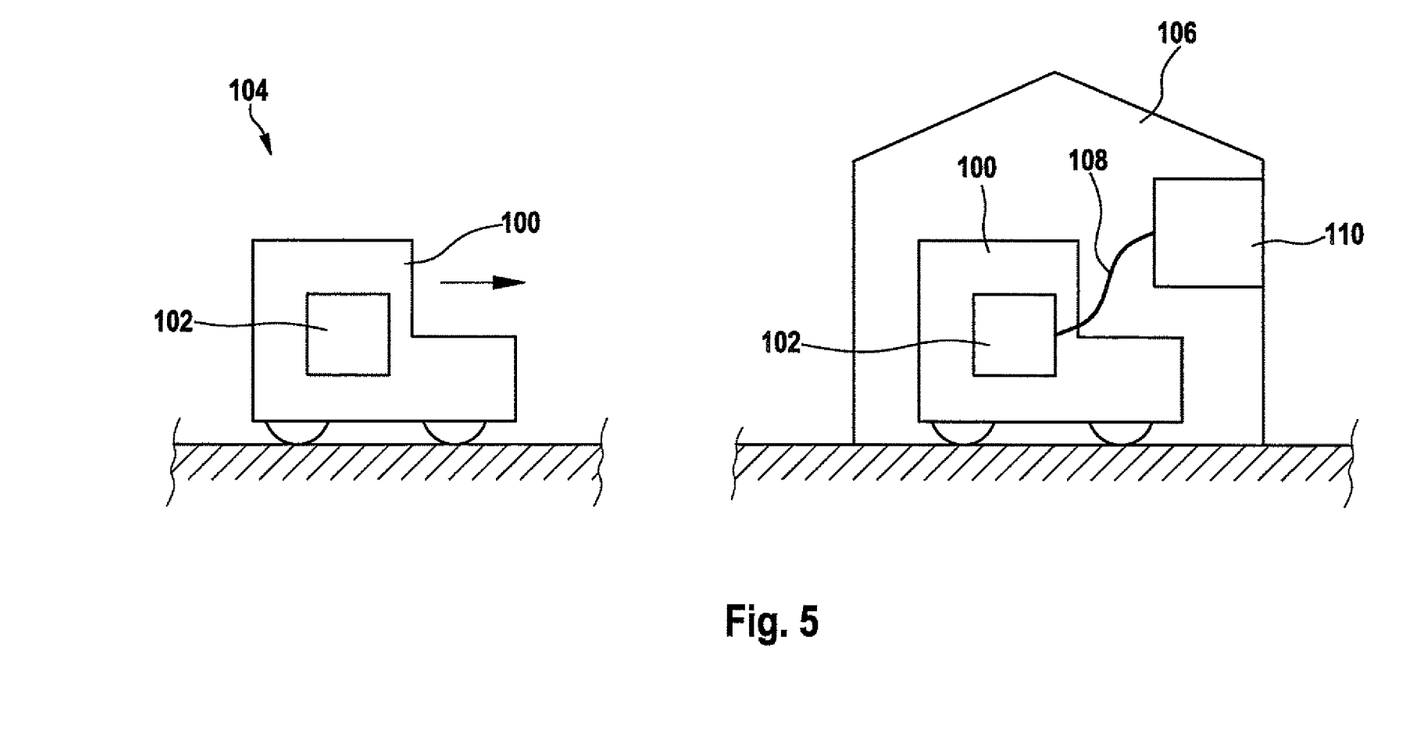
FIG. 5 shows, in schematic representation, a configuration when implementing a second form of the method according to the present invention.

FIG. 5 shows a schematic representation of a vehicle 100 which includes a specific embodiment of a control unit 102 according to the present invention. Vehicle 100 in the left section of FIG. 5 is depicted during operation in a first operating state 104. In a right section of FIG. 5, vehicle 100 is in a service garage 106.

Control unit 102 permits a further specific embodiment of the method according to the present invention. Using this method, it is possible to acquire information from the operation of vehicle 100. In so doing, in operating state 104 of vehicle 100, first information is acquired from raw data. Moreover, additional second information is ascertained from the raw data concerning this operating state via statistical methods. The first and second information with respect to operating state 104 is then stored. When vehicle 100 is in service garage 106, an assignment and diagnosis of operating state 104 of vehicle 100 may be carried out. To that end, in the present specific embodiment, a connection 108 is provided between the control unit and a diagnostic tool 110. The acquired first and second information concerning operating state 104 is transmitted via connection 108 to diagnostic tool 110 and evaluated in order to provide the assignment and diagnosis of operating state 104.

What is claimed is:

1. A method for acquiring information from operation of a vehicle, comprising:
  acquiring first information with respect to at least one operating state of the vehicle by a control unit;
  performing, by the control unit, a statistical analysis on the first information to form second information; and
  storing the first information and the second information in a memory, wherein a resolution at which the second information is stored is scaled such that:
    the resolution of the second information is increased in response to a determination by the control unit that the vehicle is in a faulty operating state; and
    the resolution of the second information is decreased in response to a determination by the control unit that the vehicle is in a non-faulty operating state.

2. The method as recited in claim 1, wherein statistical characteristic values are stored as the second information.

3. The method as recited in claim 1, wherein the first information is raw data, which is provided by at least one sensor.

4. The method as recited in claim 1, wherein the first information and the second information are acquired with respect to an operating state of an exhaust system for an internal combustion engine, which is operated with diesel or gasoline.

5. The method as recited in claim 1, further comprising: determining a detail concerning the at least one operating state of the vehicle as a function of the stored first information and the stored second information.

6. The method as recited in claim 5, further comprising: transmitting at least one of the first information and the second information to a device for performing diagnostics.

7. The method as recited in claim 1, further comprising: deriving a probability of malfunctions in the at least one operating state from the second information.

8. The method as recited in claim 7, further comprising: determining specific malfunctions or faulty components from the derived probability.

9. The method as recited in claim 1, wherein the control unit forms the second information using a non-linear scale, according to which non-scaled values of the second information are non-uniformly distributed along a bit coding that represents the scaled second information.

10. A control unit for acquiring information from a driving operation of a vehicle, the control unit including circuitry adapted to:
acquire first information with respect to at least one operating state of the vehicle;
perform a statistical analysis on the first information to form second information; and
store the first information and the second information in a memory, wherein a resolution at which the second information is stored is scaled such that:
the resolution of the second information is increased in response to a determination by the control unit that the vehicle is in a faulty operating state; and
the resolution of the second information is decreased in response to a determination by the control unit that the vehicle is in a non-faulty operating state.

11. A non-transitory storage device storing a computer program that is executable by a processing unit, the computer program, when executed by the processing unit, causing the processing unit to perform the steps of:
acquiring first information with respect to at least one operating state of a vehicle;
performing a statistical analysis on the first information to form second information; and
storing the first information and the second information in a memory, wherein a resolution at which the second information is stored is scaled such that:
the resolution of the second information is increased in response to a determination by the control unit that the vehicle is in a faulty operating state; and
the resolution of the second information is decreased in response to a determination by the control unit that the vehicle is in a non-faulty operating state.

12. A non-transitory computer-readable medium storing program-code that is executable by a processing unit, the program code, when executed by the processing unit, causing the processing unit to perform the steps of:
acquiring first information with respect to at least one operating state of a vehicle;
performing a statistical analysis on the first information to form second information; and
storing the first information and the second information in a memory, wherein a resolution at which the second information is stored is scaled such that:
the resolution of the second information is increased in response to a determination by the control unit that the vehicle is in a faulty operating state; and
the resolution of the second information is decreased in response to a determination by the control unit that the vehicle is in a non-faulty operating state.

13. A method for acquiring diagnostic information from operation of a diesel particulate filter of an engine of a vehicle, comprising:
acquiring, by a controller, first information with respect to at least one operating state of the diesel particulate filter;
performing, by the controller executing a statistical method, a statistical analysis on the first information to form second information; and
storing, by the controller, the first information and the second information in a memory, wherein a resolution at which the second information is stored is scaled such that:
the resolution of the second information is increased in response to a determination by the control unit that the vehicle is in a faulty operating state; and
the resolution of the second information is decreased in response to a determination by the control unit that the vehicle is in a non-faulty operating state.

14. The method of claim 13, further comprising: transmitting at least one of the scaled first information and the scaled second information to a diagnostic tool via a connection.

15. The method of claim 13, wherein the statistical method includes checking at least one of positive conditions and negative conditions.

16. The method of claim 15, wherein a first positive condition indicates a start of execution of the statistical method and a high soot load in the diesel particulate filter, and a second positive condition indicates that a regeneration of the diesel particulate filter is advanced sufficiently and that a percentage decrease of soot mass with respect to a starting soot mass is below a specified threshold.

17. The method of claim 15, wherein the negative condition indicates a regeneration of the diesel particulate filter is too short and that a percentage soot mass is above a specified threshold.

18. The method of claim 13, wherein the scaling is a non-linear mapping.

19. The method of claim 13, wherein the scaling includes nonlinearly mapping temperature values of the diesel particulate filter to binary bit codes.

* * * * *